United States Patent [19]

Green et al.

[11] 4,413,805

[45] Nov. 8, 1983

[54] VALVE DETENT

[76] Inventors: Robert H. Green, 17518 Euler Rd., Bowling Green, Ohio 43402; James D. Simon, 10410 S. Dixie Hwy., Portage, Ohio 43451

[21] Appl. No.: 274,749

[22] Filed: Jun. 18, 1981

[51] Int. Cl.³ .............................................. F15B 13/01
[52] U.S. Cl. .................................................. 251/297
[58] Field of Search ................. 251/297; 137/625.69

[56] References Cited

U.S. PATENT DOCUMENTS

| | | | |
|---|---|---|---|
| 2,310,745 | 2/1943 | Parks et al. | 137/556 |
| 2,547,254 | 9/1951 | Braithwaite | 137/625.17 |
| 2,569,967 | 10/1951 | Ashton | 251/297 |
| 2,573,761 | 11/1951 | Firth | 137/535 |
| 2,750,117 | 6/1956 | Pascolini | 251/297 |
| 3,174,500 | 3/1965 | Johnson et al. | 137/115 |
| 3,476,148 | 11/1969 | McMillen | 251/297 |
| 3,986,701 | 10/1976 | Hopkins | 251/297 |
| 4,185,661 | 1/1980 | Gill et al. | 251/297 |
| 4,260,132 | 4/1981 | Habiger | 251/297 |

FOREIGN PATENT DOCUMENTS

| | | | |
|---|---|---|---|
| 575074 | 4/1959 | Canada | 251/297 |
| 807731 | 4/1951 | Fed. Rep. of Germany | 251/297 |
| 2506453 | 8/1976 | Fed. Rep. of Germany | 251/297 |

*Primary Examiner*—H. Jay Spiegel
*Attorney, Agent, or Firm*—Emch, Schaffer & Schaub

[57] ABSTRACT

The invention is directed to a detent and a method for maintaining a valve body of a valve in a predetermined position. The valve has an outer housing and a valve body is slideably positioned in the outer housing. A raised diameter section is located on the outer periphery of the valve body. A resilient detent member is positioned around the outer periphery of the valve body. The detent member has a diameter less than the diameter of the raised diameter section. The detent member is positioned to engage the raised diameter section when the valve body is in the preselected position. The engagement of the raised diameter section by the detent member maintains the valve body in the preselected position.

12 Claims, 5 Drawing Figures

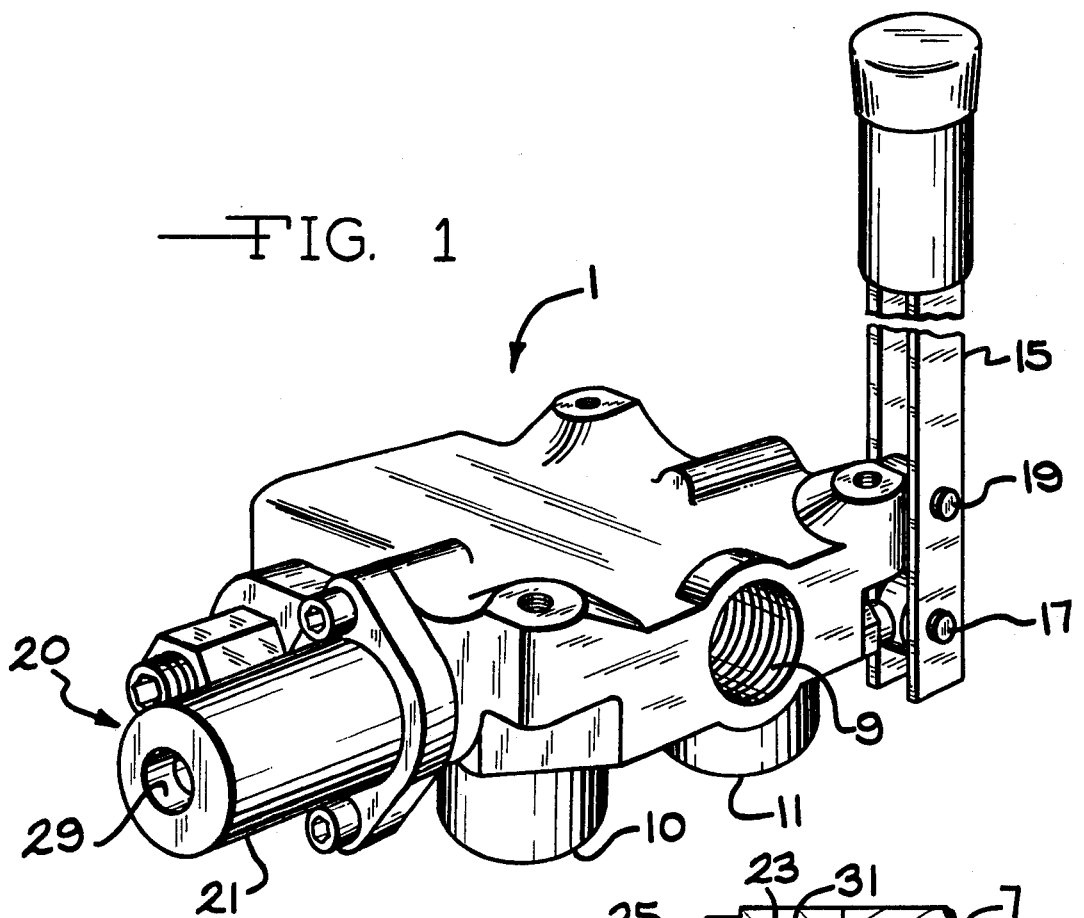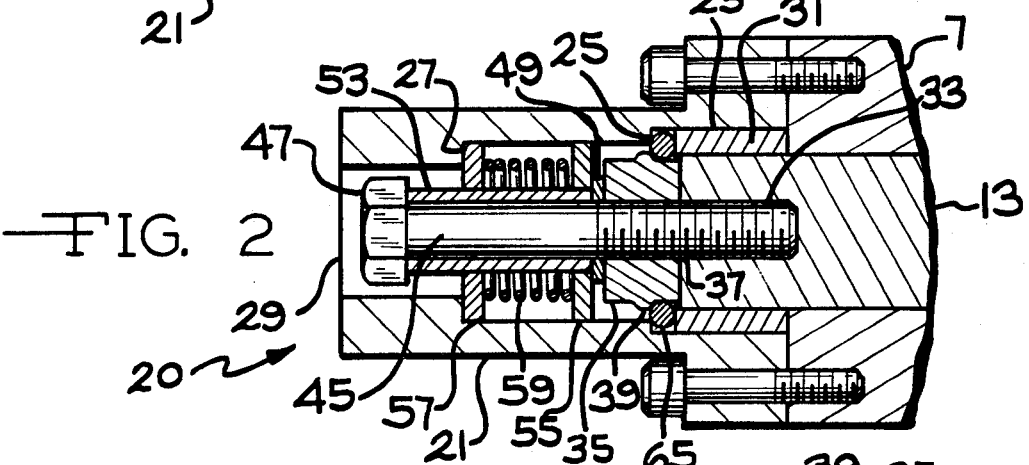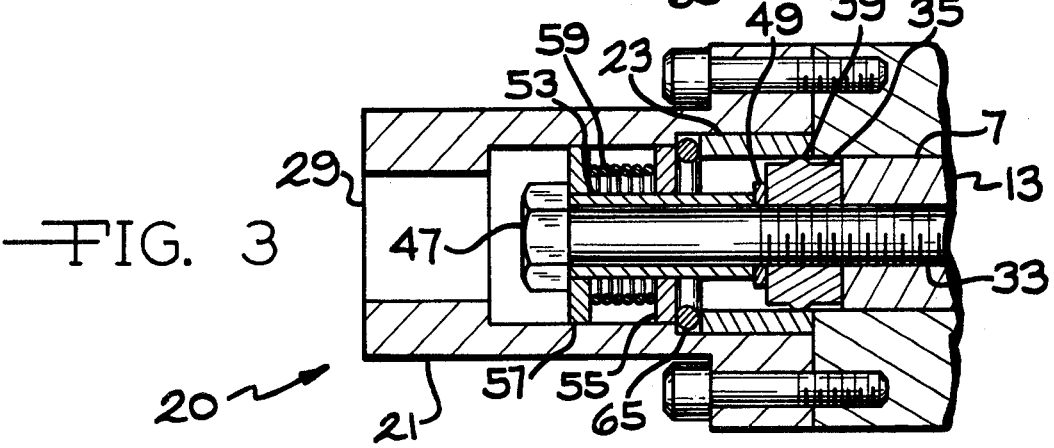

VALVE DETENT

BACKGROUND OF THE INVENTION

The present invention relates to a detent for a valve. More particularly the invention relates to a resilient detent that is positioned circumferentially around a slideable valve body in a hydraulic valve. In prior art hydraulic valves there has frequently been a need to maintain the hydraulic valve at a select position during the operation of the valve. The valve is usually held in the select position to allow a hydraulic cylinder associated with the valve to complete its stroke in one direction.

To accomplish the maintaining of the valve in a predetermined position a detent is brought to bear against the slideable valve body in the valve. The detent is frequently a pin that is spring loaded or biased towards the valve body. The valve body is adapted with an aperture for receiving the pin of the detent. When the valve body is positioned in the desired location the aperture will be in alignment with the pin of the detent. The pin will then be caused to engage the aperture by the biasing force or the spring loading on the pin. Accordingly, the pin will engage the aperture and maintain the valve body in the desired location.

When it is desired to move the valve body from the preselected position a force will have to be applied to the valve body sufficient to cause the pin of the detent to be disengaged from the aperture in the valve body. Normally, this force will have to be sufficient to overcome the biasing force of the spring loading and cause the pin to move away from the aperture in the valve body. Once the pin has been disengaged from the aperture the valve body will be free to move until the valve body is again put in a position where the aperture in the valve body is in alignment with the pin of the detent whereby the pin will engage the aperture and maintain the valve body in the desired position.

The above-described valve detents are difficult to position in the housing for the valve. The pin must be positioned so that it is capable of moving in a direction substantially perpendicular to the surface of the valve body. The pin of the detent must also be spring loaded or biased towards the valve body. Accordingly, a cavity or other suitable area must be provided in the housing for the valve to properly position and bias the pin of the detent towards the valve body. The aperture in the valve body must also be carefully positioned so that it will matingly align with the spring loaded pin of the detent. If the aperture is not properly positioned the detent will not be able to engage the aperture or the detent will engage the aperture and not hold the valve body in the preselected position.

The above-described prior art detents are expensive to make and difficult to position within the body of the valve. Frequently there is not a good location in the valve housing where the detent can be positioned and engage an appropriate part of the slideable valve body. The problems associated with positioning the detent become more significant if the valve is small. In addition, the prior art detents are difficult to properly maintain and service within the valve. Frequently it is necessary to completely disassemble the entire valve arrangement to get access to the detent assembly. It is also necessary that the detent arrangement found in the prior art be manufactured very carefully and assembled very carefully so that the detent will work properly in connection with the valve body. Further, these prior art detents are expensive to manufacture and assemble, and significantly increase the price of any valve with which they are associated.

SUMMARY OF THE INVENTION

According to the present invention there is provided a detent for maintaining a valve body of a valve in a preselected position in the outer housing for the valve. The valve body is slideably positioned in the outer housing for the valve. A raised diameter section is located on the outer periphery of the valve body. A resilient detent member is positioned around the outer periphery of the valve body. The detent member has a diameter less than the diameter of the raised diameter section on the valve body. The detent member is positioned to engage the raised diameter section when the valve body is in the preselected position. The engagement of the raised diameter section by the detent member maintains the valve body in the preselected position.

There is also provided according to the invention a method for maintaining a moveable valve body having a raised diameter section in a predetermined position in a passageway in the outer housing of a valve. The valve body having a raised diameter section is positioned in a predetermined position in the outer housing for the valve. A resilient detent member engages the raised diameter section on the valve body. The detent member is positioned around the outer periphery of the valve body. The detent member maintains the valve body in a predetermined position in the passageway in the valve housing.

An object of the invention is to provide an improved detent for a valve.

Another object of the invention is to provide a low cost and easily installed detent for a valve.

Other objects and advantages of the invention will become apparent as the invention is described hereinafter in more detail with reference to the accompanying drawings.

DESCRIPTION OF THE DRAWINGS

FIG. 1 is a perspective view of the valve detent of the present invention;

FIG. 2 is a partial cross sectional view of the valve detent shown in FIG. 1;

FIG. 3 is a partial cross sectional view of the valve detent of the present invention;

DESCRIPTION OF THE PREFERRED EMBODIMENTS

Figure 4:
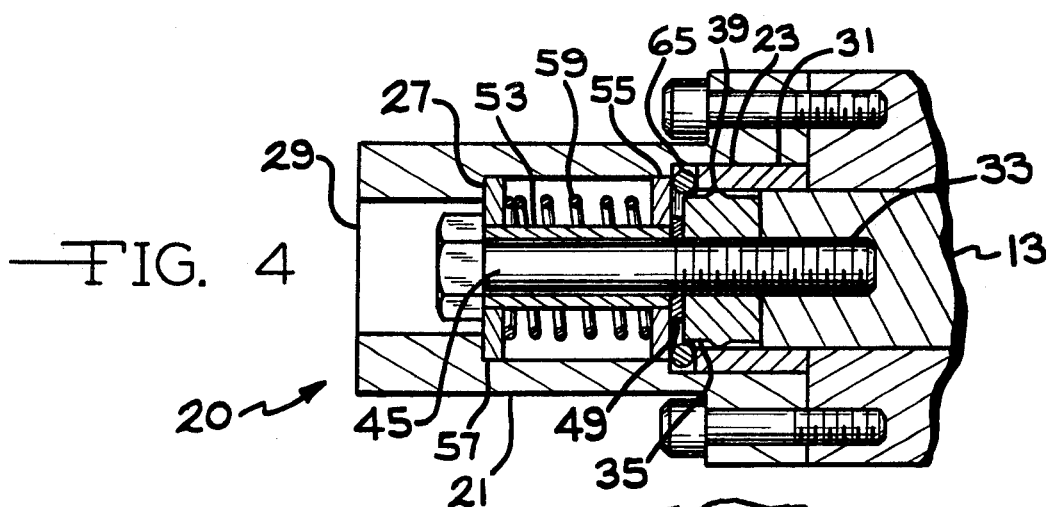
FIG. 4 is a partial cross sectional view of the valve detent of the present invention.
Figure 5:
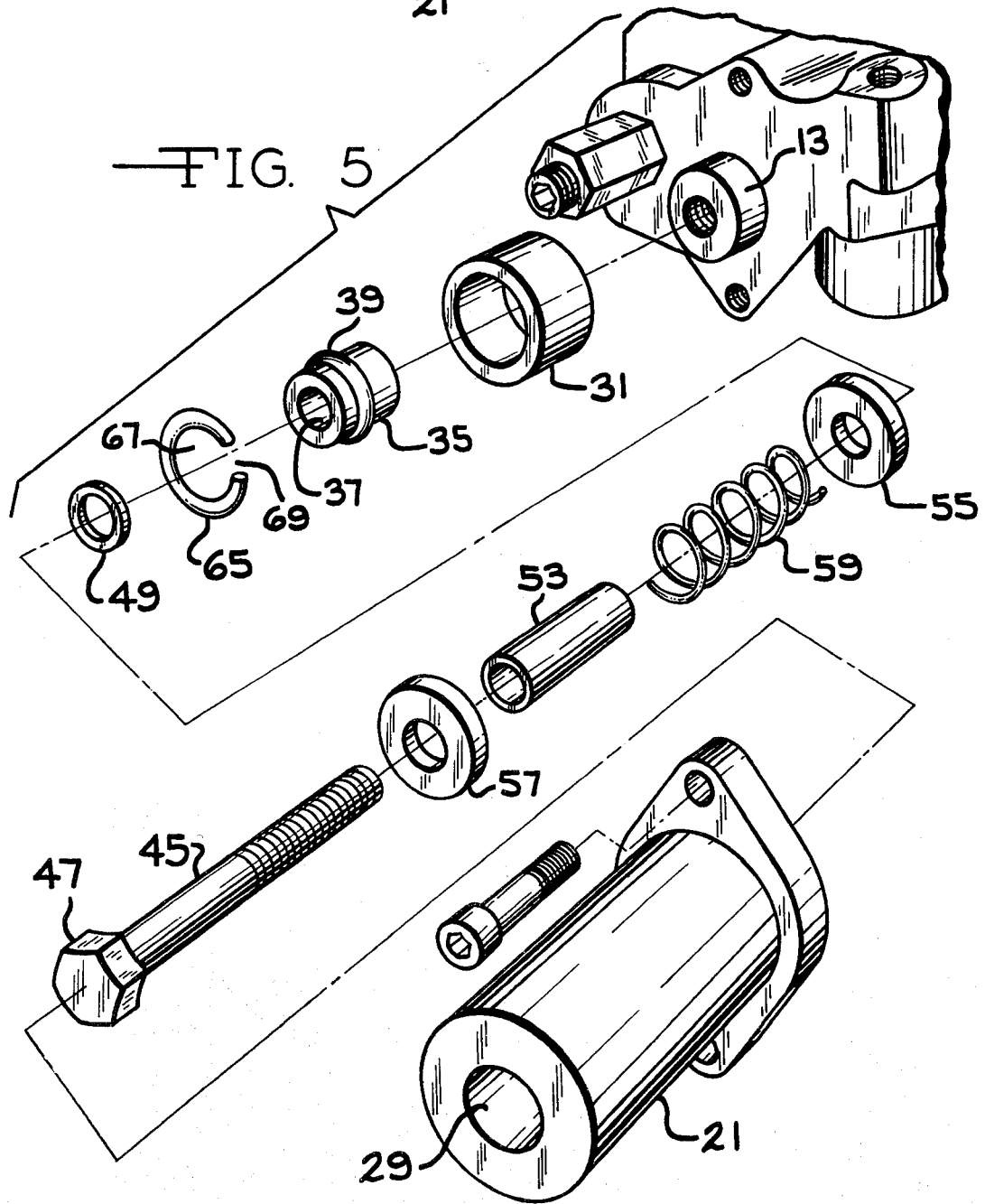
FIG. 5 is a partial perspective view, in diagramatic form, of the valve detent of the present invention.

This invention relates to a detent for a valve. More particularly the invention relates to a resilient detent that is positioned circumferentially around a slideable valve body in a hydraulic valve. The details of the invention will be more readily understood by referring to the attached drawings in connection with the following description.

The present invention is directed to a valve 1 having an outer housing 3. A passageway 7 is defined in the outer housing 3. The passageway 7 extends through the entire width of the outer housing 3. Inlet port 9 is positioned on one surface of the outer housing. The inlet port extends into the housing and into communication with the passageway 7. The inlet port is positioned substantially perpendicular to the longitudinal axis or center line of the passageway 7. A first discharge port 10 and a second discharge port 11 are positioned on another surface of the outer housing. The first and second discharge ports extend into the housing and into communication with the passageway 7. The center line or longitudinal axis of the first and second discharge ports are substantially parallel and substantially perpendicular to the center line of the passageway 7. There is also a third discharge port (not shown) that is positioned on the surface of the housing opposite to the surface where the inlet port 9 is located. The third discharge port extends into the housing and into communication with the passageway 7. The longitudinal axis or center line of the third discharge port is substantially parallel to and in alignment with center line of the inlet port 9.

A valve body 13 is slideably positioned in the passageway 7. At one end of the passageway 7 there is located a handle 15 that is pivotally connected to the outer housing 3 and the valve body 13. The handle 15 pivots around pin 17 where the handle is connected to the outer housing. A pin 19 also pivotally connects the handle 15 to the valve body 13.

On the other end of the passageway 7 there is positioned a biasing means 20. The biasing means contains a substantially cylindrical collar 21 and there is a bore 23 in the collar that is in substantial alignment with the passageway 7. There is a first shoulder 25 and a second shoulder 27 positioned in the bore 23. The bore 23 terminates in an aperture 29 in the end of the collar 21.

One end of the valve body 13 extends from the outer housing 3 into the bore 23 in the collar 21. A cylindrical spacer 31 is positioned in the bore 23 around the end of the valve body that extends into the bore 23. The end of the valve body 13 that extends into the bore 23 contains an aperture 33. A cylindrical member 35 is positioned on the end of the valve body. The cylindrical member contains a passageway 37 that is located substantially in the center of the cylindrical member 35. The passageway 37 is in substantial alignment with the aperture 33 in the valve body 13 when the cylindrical member 35 is properly positioned on the valve body 13. The cylindrical member has a diameter that is less than the diameter of the valve body 13. There is a raised portion 39 located in substantially the center of the periphery of the cylindrical member.

A bolt 45 having a threaded end is positioned in the bore 23 in the collar 21. The threaded end of the bolt passes through the passageway 35 in the cylindrical member and into the aperture 33 in the valve body 13. The bolt acts to secure the cylindrical member 35 to the valve body 13. The other end of the bolt adjacent the cylindrical member 35 is a spacer 49. Positioned on the shaft of the bolt, between the spacer 49 and the head 47, is a sleeve 53. Slideably positioned on the sleeve 53 is a first washer 55 and a second washer 57. The first washer 55 and second washer 57 are constrained in movement along the sleeve 53 by the head 47 of the bolt 45 and the spacer 49 positioned on the shaft of the bolt. The diameter of the second washer 57 is large enough that the second washer will engage the second shoulder 27 positioned in the bore 23. Positioned between the first washer 55 and the second washer 57 is a resilient member 59. The resilient member is normally a helical spring positioned around the sleeve 53 on the bolt 45.

A resilient detent member 65 is positioned on the bore 23 between the first washer 55 and the cylindrical spacer 31. The detent member is cylindrical in shape and contains an opening 67 in the center of the detent member. There is a space 69 defined in one portion of the detent member to allow the detent member to increase in diameter. Normally the detent member 65 is formed of a resilient spring steel and the detent member will resemble the snap ring. The diameter of the opening 67 in the detent member 65 is larger than the diameter of the cylindrical member 35. However, the diameter of the opening 67 is less than the diameter of the raised portion 39 located on the cylindrical member 35. The diameter of the detent member 65 is large enough that the member will engage the first shoulder 25 located in the bore 23 and the cylindrical spacer 31 positioned in the bore 23. The first shoulder 25 and spacer 31 act to locate the detent member in the bore 23 and prevent the detent member from moving in a direction parallel to the center line of the bore 23.

The operation of the valve 10 of the present invention will be more fully understood by referring to the attached drawings in connection with the following description.

In the drawings a hydraulic valve is used to disclose the features of the valve detent of the present invention. Although a hydraulic valve is shown, it should be understood that the detent has broader application and can be used in other applications without departing from the scope of the invention.

Hydraulic fluid is supplied to the valve 1 through inlet port 9 positioned on the side of the valve. The fluid enters the valve through the inlet port 9 and comes into contact with the slideable valve body 13 located in the interior of the valve. The valve body directs the fluid to one of three discharge openings. The fluid can pass through the valve body 13 and exit the valve through a third discharge port (not shown) located on the opposite side of the valve from where the inlet port 9 is positioned. When the fluid passes through the valve in this matter the valve is said to be in a neutral position. The valve body 13 can be moved within the valve 1 to direct the fluid to the first discharge port 10 or the second discharge port 11. Normally discharge port 10 and discharge port 11 are connected to a hydraulic cylinder which can be operated utilizing the valve 1. When the fluid is directed to the first discharge port 10 the hydraulic cylinder is caused to move in one direction. When the fluid is directed to the second discharge port 11 the hydraulic cylinder is caused to move in the reverse or opposite direction. Thus, by changing the position of the valve body 13 in the valve the operation of a hydraulic cylinder connected to the valve can be controlled.

The positioning of the valve body 13 is controlled by the handle 15. The handle 15 is positioned so that it pivots around pin 17 that is located on one end of the handle. The handle is connected to the valve body 13 by pin 19. Thus, the handle 15 can be moved towards or away from the valve 1 to change the position of the valve body 13 in the interior of the valve. The pin 19 in the handle 15 is moved toward the valve to displace the valve body 13 so that the fluid entering the inlet port 9 is discharged through the first discharge port 10. The pin 19 in the handle 15 is moved away from the valve to displace the valve body 13 so that the fluid entering inlet port 9 is discharged through the second discharge port 11. When the pin 19 is in a position intermediate where the fluid is discharged through the first discharge port 10 or the second discharge port 11, the fluid will be discharged through the third discharge port (not shown) located opposite the inlet port 9.

A biasing means 20 is positioned on the surface of the valve 1 opposite to the handle 15. The biasing means 20 is positioned so that it can act to control the position of the valve body 13 in the passageway 7 in the valve 1.

FIG. 4 shows the biasing means 20 where the valve body 13 is in the neutral position where the fluid entering inlet port 9 passes through the valve body and is discharged from the valve through the third discharge port located on the surface of the valve opposite to the inlet 9. In this figure the first washer 55 is located coaxially on the sleeve 53 and is positioned against the spacer 49 located adjacent the cylindrical member 35. The surface of the first washer 55 is also in contact with the resilient detent member 65. The resilient detent member is held in position by cylindrical spacer 31 and by the first shoulder 25 in the bore 23. The resilient detent member 65 acts as a stop or positioning means for the first washer 55. The second washer 57 is positioned coaxially on the sleeve 53 and is in engagement with the second shoulder 27 in the bore 23. The second washer 57 is also in contact with the head 47 of the bolt 45. The first washer 55 is held in position against the resilient detent member 65 and the second washer 57 is held in position against the second shoulder 27 by resilient member 59 which is positioned around the sleeve 53. The biasing force of the resilient member 59 acts upon the first washer 55 and second washer 57. This biasing force is transferred to the head 47 of the bolt 45 by the second washer and to the spacer 49 by the first washer 55. The biasing force maintains the head 47 of the bolt 45 and the spacer 49 in the position shown in FIG. 4. Accordingly, the bolt 45, and the cylindrical member 35 and valve body 13 that are connected to the bolt are maintained in this position.

To vary the position of the valve body 13 within the passageway 7 a force must be exerted on the valve body that is sufficient to overcome the biasing force of the resilient member 59. The handle 15 is provided to assist in moving the valve body 13 in the passageway 7 to change the point of discharge of the fluid from the valve 1.

FIG. 2 shows the valve detent of the present invention where the pin 19 in the handle 15 has been advanced toward the valve 1. This movement of the handle 15 causes the valve 13 to advance towards the biasing means 20. In this figure it can be seen that the valve body 13, cylindrical member 35, first washer 55 and bolt 45 have been displaced toward the aperture 29 in the biasing means 20. As the valve body 13 is displaced toward the aperture 29 of the valve body enters the bore 23 in the collar 21 of the biasing means 20. The valve body 13 passes into the region where the cylindrical spacer 31 is located. The displacement of the valve body 13 and bolt 45 causes the spacer 49 to be displaced. The spacer 49 engages the first washer 55 and causes the first washer to be displaced towards the second washer 57. The resilient member 59, located between the first and second washers, is compressed as the first washer advances towards the second washer. As the valve body 13 moves towards the biasing means 20 the raised portion 39 of the cylindrical member 35 engages the resilient detent member 65. The resilient detent member is constructed so that it can expand to accomodate the raised portion 39. If the valve body 13 is advanced far enough the resilient detent member 65 will pass over the raised portion 39 and come to rest on the smaller diameter cylindrical portion 39 of the cylindrical portion 38 of the cylindrical member 35 that is adjacent the valve body 13. After the resilient detent member passes over the raised portion 39 it contracts to its normal diameter. The positioning of the resilient detent member 65 on the portion 38 of the cylindrical member 35 causes the cylindrical member and valve body 13 to be maintained in this position. The valve body 13 can not move towards the handle 15 because the detent member will contact the raised portion 39 and prevent movement in this direction. The valve body 13 can not move towards the biasing means 20 because the valve body will contact the detent member and be prevented from movement in this direction. To move the valve body 13 in a direction towards the handle 15 it is necessary to supply a force to the valve body 13 that will cause the detent member to expand to an extent to allow the raised portion 39 to pass through the detent member. The biasing force of the resilient member 59 is selected so that it does not provide sufficient force to the valve body and cylindrical member to cause the resilient detent member 65 to expand over the raised portion 39.

Normally additional mechanism (not shown) is attached to the hydraulic cylinder being operated by the valve 1 to engage the handle 15 when the cylinder has reached the end of its stroke. This additional mechanism causes the pin 19 on the handle 15 to move away from the valve 1 with sufficient force to cause the resilient detent member 65 to pass over the raised portion 39 on the cylindrical member 35. Once the detent member expands and passes over the raised portion 39 the detent is positioned on the surface of the cylindrical member 35 that is adjacent the first washer 55. The biasing force of the resilient member 59 then acts on the first washer 55 and displaces the first washer 55, cylindrical member 35 and the valve body 13 towards the handle 15 until the second washer 55 comes into engagement with the resilient detent member 65. In other words, the resilient member 59 will cause the valve body to return to the neutral position shown in FIG. 4.

FIG. 3 shows the present invention where the handle 15 has been moved to cause the pin 19 to move away from the valve 1. This causes the valve body 13, cylindrical member 35 and bolt 45 to move towards the handle 15 and away from the aperture 29 in the collar 21. As the valve body 13 moves toward the handle 15 the cylindrical member 35 passes under the cylindrical spacer 31 located in the bore 23 of the collar 21. The head 47 of the bolt 45 engages the second washer 57 and causes the second washer to move toward the first washer 55. As the first washer 55 is restrained from moving towards the handle 15 by the resilient detent member 65 the resilient member 59 is compressed between the first washer 55 and the second washer 57. When the resilient member 59 is completely compressed further movement of the valve body 13, cylindrical member 35 and bolt 45 towards the handle 15 is prevented. When the valve body 13 is in the position shown in FIG. 3 fluid entering inlet port 9 is discharged from discharge port 11.

To maintain the valve body 13 in the position shown in FIG. 3 it is necessary to maintain a force on the handle 15 that overcomes the biasing force exerted by the resilient member 59. When the force on the handle 15 is released the biasing means 59 acts upon the second washer 57 and causes the second washer to move toward the second shoulder 27. The biasing force of the resilient member continues to displace the second washer 57 and valve body 13 until the second washer 57 engages the second shoulder 27 and the valve body 13 is returned to the neutral position as shown in FIG. 4.

Having described the invention in detail and with reference to the drawing it should be understood that such a description is given for the sake of explanation. Various modifications and substitutions, other than those cited, can be made without departing from the scope of the following claims.

What I claim is:

1. A detent for maintaining a valve body of a valve in a preselected position comprising:
    an outer housing for said valve;
    a valve body slideably positioned in said outer housing;
    a raised diameter section located on and extending around the outer periphery of said valve body;
    a resilient ring shaped detent member positioned around substantially the entire outer periphery of said valve body, said ring having a first end and a second end, said first and second ends being disposed to facilitate expansion of said ring to engage said raised diameter section on said valve body, said detent member having a diameter greater than the diameter of said valve body and less than the diameter of said raised diameter section, said entire detent member being spaced apart from said valve body to allow said valve body to freely slide in said outer housing when said valve body is in a position other than said preselected position, said detent member positioned to resiliently engage substantially the entire outer periphery of said raised diameter section when said valve body is in said preselected position whereby the engagement of said raised diameter section by said detent member maintains said valve body in said preselected position.

2. The detent of claim 1 wherein a passageway is defined in said outer housing for said valve and said valve body is slideably positioned in said passageway.

3. The detent of claim 1 wherein a biasing means is connected to said valve body to urge said valve body to a position in said outer housing other than said preselected position.

4. The detent of claim 3 wherein said biasing means includes a cylindrical collar positioned on said outer housing, said collar defining a passageway and said passageway in said collar being in substantial alignment with said passageway in said outer housing.

5. The detent of claim 4 wherein said biasing means includes a resilient member positioned in said collar, said resilient member acting upon the valve body to position said valve body in said passageway in said outer housing at a location other than said preselected position.

6. The valve detent of claim 5 wherein means for positioning said valve body is operatively connected to said valve body, said positioning means being capable of overcoming the biasing force of said biasing means.

7. The detent of claim 1 wherein said ring of resilient material contains a gap therein to facilitate expansion of said ring to engage said raised diameter section on said valve body.

8. The detent of claim 7 wherein said ring forming said detent member is maintained in a single location in the outer housing whereby said detent member engages said raised diameter section when said valve body is in said preselected position.

9. Method for maintaining a movable valve body having a raised diameter section in a predetermined position in a passageway in an outer valve housing comprising:
    positioning said valve body having a raised diameter section in a predetermined position in said outer housing;
    engaging said raised diameter section with a resilient ring shaped detent member, said detent member being positioned around the outer periphery of said valve body, said ring shaped detent member having a first end and a second end, said first and second ends being disposed to facilitate expansion of said ring shaped detent member to engage said raised diameter section on said valve body, said detent member having a diameter larger than the diameter of said valve body and less than the diameter of said raised diameter section, said entire detent member being spaced apart from said valve body to allow said valve body to move freely in said outer housing when said valve body is in a position other than said preselected position, said detent member engaging substantially the entire outer periphery of said raised diameter section whereby said detent member maintains said valve body in a predetermined position in said passageway in said valve housing.

10. The method of claim 9 in which biasing means is provided, said biasing means engaging said valve body and urging said valve body to a position in said outer housing other than said preselected position.

11. The method of claim 9 in which means for positioning said valve body is provided, said positioning means acting on said valve body to position said valve body in said passageway in said outer housing.

12. A detent for maintaining a valve body of a valve in a preselected position comprising:
    an outer housing for said valve;
    a passageway defined in said outer housing;
    a substantially cylindrical valve body slideably positioned in said passageway in said outer housing, said valve body having at first end and a second end;
    a raised diameter section located on and extending around the outer periphery of said valve body, said raised diameter section being located adjacent said first end of said valve body;
    means for moving said valve body in said passageway connected to said second end of said valve body, said moving means disposed for positioning said valve body in said preselected position;
    means for biasing said valve body in said passageway connected to said first end of said valve body, said biasing means acting upon said valve body to maintain said valve body in a position in said passageway other than said preselected position;
    a resilient detent member positioned in said passageway in said outer housing, said detent member being a substantially circular ring that extends around substantially the entire outer periphery of said valve body, said ring having a first end and a second end, said first and second ends being disposed to facilitate expansion of said ring to engage said raised diameter section on said valve body, said detent member having a diameter larger than the diameter of said valve body and less than the diameter of said raised diameter section, said entire detent member being spaced apart from said valve body to allow said valve body to freely slide in said passageway when said valve body is in a position other than said preselected position, said detent member being disposed to engage said raised diameter section when said valve body is positioned in said preselected position by said moving means, said detent member engaging substantially the entire surface of said raised diameter section with sufficient force to maintain said valve body in said preselected position against the biasing force of said biasing means, said biasing means causing said valve body to move to a position in said passageway other than said preselected position when said moving means moves said raised diameter secion from engagement with said detent member.

* * * * *